United States Patent [19]
Rawson

[11] 3,719,415
[45] March 6, 1973

[54] RADIAL AND TANGENTIAL POLARIZERS

[75] Inventor: Eric Gordon Rawson, Stirling, N.J.

[73] Assignee: Bell Telephone Laboratories, Incorporation, Murray Hill, N.J.

[22] Filed: Sept. 22, 1971

[21] Appl. No.: 182,741

[52] U.S. Cl..............350/157, 350/96 WG, 350/147
[51] Int. Cl..............................................G02b 27/28
[58] Field of Search .350/96 WG, 147, 157, 159, 150

[56] References Cited

UNITED STATES PATENTS

| | | | |
|---|---|---|---|
| 3,617,934 | 11/1971 | Segre | 350/150 |
| 3,101,472 | 8/1963 | Goubau | 350/96 WG |
| 2,994,873 | 8/1961 | Goubau | 350/96 WG |

Primary Examiner—David Schonberg
Assistant Examiner—Paul R. Miller
Attorney—R. J. Guenther et al.

[57] ABSTRACT

Radial and tangential polarizers selectively attenuate meridional or skew rays in a focusing waveguide. A radial polarizer is a polarizer in which the direction of polarization at any point in the polarizer is approximately parallel to a radial line from the center of the polarizer. A tangential polarizer is a polarizer in which the direction of polarization at any point in the polarizer is approximately perpendicular to a radial line from the center of the polarizer. A pair of radial polarizers or a pair of tangential polarizers spaced apart at an odd multiple of one-fourth of the period of oscillation of a meridional ray about the center of the optical path attenuate skew rays in favor of meridional rays. A radial polarizer and a tangential polarizer similarly spaced attenuate meridional rays in favor of skew rays.

6 Claims, 4 Drawing Figures

RADIAL AND TANGENTIAL POLARIZERS

BACKGROUND OF THE INVENTION

This concerns optical apparatus and in particular apparatus for selectively reducing aberrations in focusing elements.

The light propagating in optical systems may be classified generally as meridional rays and skew rays. Meridional rays propagate through the system in a direction that can be resolved into one component that is parallel to the optical axis of the system and a second component that is perpendicular to it. For these rays there is no third component perpendicular to the other two. Skew rays however, propagate in a direction that has three mutually perpendicular components. Focusing elements typically exhibit different aberrations for these two types of rays. Accordingly, it is frequently desirable to find some means for selectively attenuating one or the other type of ray.

This is particularly desirable in optical waveguides used to transmit light over extremely long distances, as is necessary for high-capacity optical communication systems. One such waveguide includes a succession of conventional lenses spaced regularly along the waveguide, each of which focuses propagating light. In another type of waveguide, the conducting path is a continuous optical fiber. The index of refraction in this optical fiber decreases with distance from the optical axis of the fiber with the result that the optical fiber has properties similar to those of the waveguide having discrete conventional lenses. Such fibers are referred to as graded index (GRIN) or SELFOC fibers, the latter name being a registered trade name of the Nippon Electric Company and the Nippon Sheet Glass Company. Further details may be found in the paper by E. G. Rawson, D. R. Herriott and J. McKenna on "Analysis of Refractive Index Distributions in Cylindrical, Graded-Index Glass Rods (GRIN Rods) Used as Image Relays" *Applied Optics*, Vol. 9, No. 3, (March 1970) and in the British patent of T. Uchida and M. Sakaguchi No. 1,233,653.

In optical waveguides such as these, any propagating light ray will be observed to oscillate spatially about the optical axis. Because meridional rays have only one component perpendicular to the optical axis, the oscillation of a meridional ray is an oscillation that carries it through the optical axis of the waveguide. On the other hand, skew rays travel in more complex paths and do not pass through the optical axis. In general, the path of such rays is an elliptical helix with one sub-class of skew rays following paths that are always a constant distance from the optical axis of the waveguide (i.e. true circular helices) and with the remaining rays following paths whose distance from the optical axis varies.

As indicated above and as detailed in the aforementioned Applied Optics paper, GRIN fibers or rods exhibit significantly different aberrations for meridional and skew rays. Consequently, it is not possible to correct for aberrations in the optical system in such a way as to eliminate the aberrations of both types of rays.

SUMMARY OF THE INVENTION

Accordingly, it is an object of this invention to selectively attenuate either meridional rays or skew rays that propagate through optical waveguides.

It is a further object of this invention to reduce the aberrations inherent in light propagation through graded index glass rods (GRIN rods).

These and other objects of my invention are achieved by the use of polarizers that may be referred to as radial and tangential polarizers. A radial polarizer is a polarizer in which the direction of polarization at any point in the polarizer is approximately parallel to a radial line from the center of the polarizer. A tangential polarizer is one in which the direction of polarization at any point in the polarizer is approximately perpendicular to a radial line from the center of the polarizer.

In accordance with the invention, either meridional rays or skew rays are attenuated by placing a succession of polarizers in the optical waveguide, each separated by an odd multiple of one-fourth the period of oscillation of a meridional ray about the optical axis of the waveguide. The polarizers are centered on the waveguide so that their centers coincide with the optical axis of the waveguide. To attenuate skew rays while passing meridional rays, I place one or more pairs of radial polarizers in the optical waveguide, each polarizer separated by a spacing that is an odd multiple of a quarter of the period of oscillation of a meridional ray about the center of the optical path. Alternatively, skew rays may be attenuated by placing one or more pairs of tangential polarizers in the waveguide at the same spacing. To attenuate meridional rays in favor of skew rays, I place one or more pairs of polarizers in the waveguide, each pair consisting of a tangential and a radial polarizer spaced apart by an odd multiple of a quarter of the period of oscillation of a meridional ray about the center of the optical path. As will be explained later, the extent or degree of attenuation can be controlled.

Because either the skew rays or the meridional rays may be selectively and controllably attenuated, it is now possible to reduce, by methods well understood in the art, aberrations in the waveguide. Consequently, a substantially aberration-free output can be obtained from the optical waveguide.

BRIEF DESCRIPTION OF THE DRAWING

These and other elements, features and objects of my invention will be more readily understood in the following detailed description of my invention taken in conjunction with the following drawing in which.

DETAILED DESCRIPTION OF THE DRAWING

Figure 1:
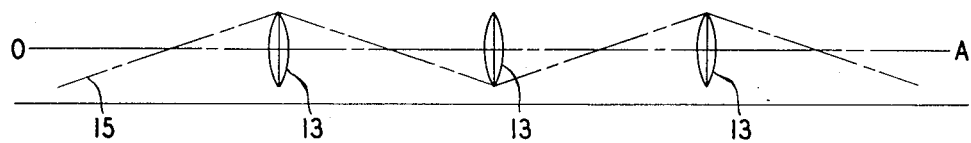
FIG. 1 is a schematic illustration of the propagation of a light ray through a conventional waveguide.

In FIG. 1 there is shown a typical waveguide 11 that uses a series of conventional lenses 13 to guide the propagation of light along an optical axis OA. In this figure the path traced by a light ray 15 is also shown. Note that ray 15 oscillates about axis OA.

As indicated above, the rays that propagate through a waveguide can be classified as meridional and skew rays. Because the aberrations of a waveguide differ for these two types of rays, I have found it desirable to selectively attenuate one type of ray in favor of the other. This attenuation is accomplished by using radial and/or tangential polarizers.

Figure 2:
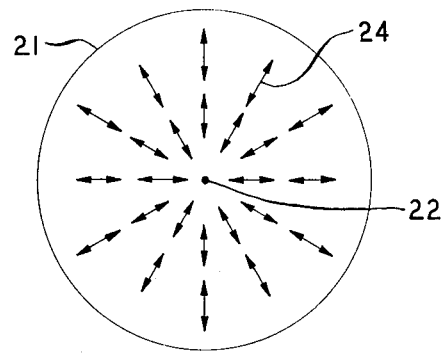
FIG. 2 is a schematic illustration of a radial polarizer according to my invention.

A schematic illustration of an illustrative radial polarizer 21 of my invention is shown in FIG. 2. The center of polarizer 21 is indicated at 22. Throughout the polarizer the direction of polarization as indicated by arrows 24 is everywhere approximately parallel to a radial line from the center 22 of the polarizer.

Figure 3:
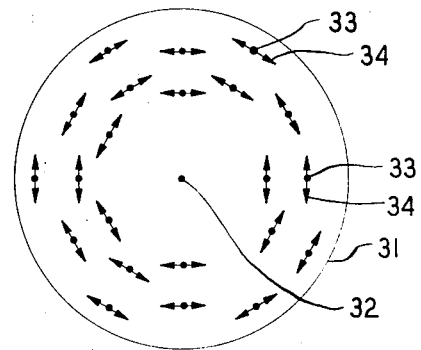
FIG. 3 is a schematic illustration of a tangential polarizer according to my invention.

A schematic illustration of an illustrative embodiment of a tangential polarizer 31 having a center 32 is shown in FIG. 3. As indicated by arrows 34, the direction of polarization at each point 33 is everywhere approximately perpendicular to a radial line from the center 32 of tangential polarizer 31.

Figure 4:
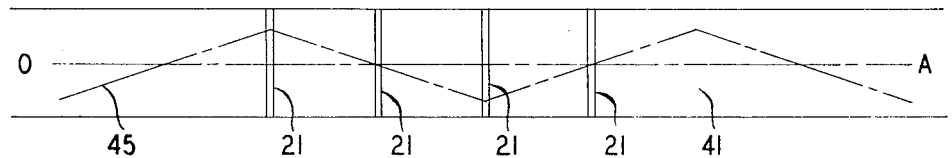
FIG. 4 is a schematic illustration of the use of the polarizers of FIGS. 2 and 3 in a waveguide to attenuate selectively the propagation of either meridional rays or skew rays.

Polarizers 21 and 31 are used to selectively attenuate skew rays and meridional rays in illustrative apparatus depicted in FIG. 4. This apparatus comprises an optical waveguide 41 in which light is propagated along optical path OA. Preferably this optical waveguide is a graded index glass rod in which individual light rays propagate along paths in a fashion described in the aforementioned *Applied Optics* paper. In particular, meridional and skew rays will both be observed to oscillate about the optical axis, with meridional rays following paths that pass directly through the optical axis, and skew rays following elliptically helical paths at either fixed or variable distances from the optical axis.

To attenuate skew rays, I place two or more polarizers at spacings that are an odd multiple of one-quarter of the period of oscillation of a meridional ray about optical axis OA, the polarizers all being either radial or all tangential polarizers. Thus, in FIG. 4 there are shown four radial polarizers 21 located at spacings that are a quarter the period of oscillation of a meridional ray 45. Attenuation of the skew rays could be achieved using only a pair of polarizers 21; but with a larger number of polarizers, it is possible to achieve even greater attenuation. Alternatively, the degree of attenuation can be controlled by controlling the density of dichroic crystals within each polarizer. The same attenuation of a skew ray could also be achieved by substituting tangential polarizers for the radial polarizers shown in FIG. 4 to attenuate meridional rays in favor of skew rays, I use one or more pairs of polarizers, each pair consisting of a radial and a tangential polarizer spaced apart a distance equal to an odd multiple of a quarter of the period of oscillation of the meridional ray. Thus, with reference to FIG. 4, I attenuate meridional rays by substituting a tangential polarizer 31 for every other radial polarizer there shown. Since radial and tangential polarizers both give linear polarization in which the field vectors are circularly symmetric about a point, they may be known as circular symmetric linear polarizers.

Radial and tangential polarizers 21 and 31 may be made in several ways. They can, for example, be manufactured by cutting conventional linear polarizers such as Polaroid polarizers and fitting the pieces together so that the direction of polarization conforms to the directions described above.

They may also be formed by various drawing operations similar to those used in manufacturing polarizers such as Polaroid polarizers. In this procedure, a suspension of dichroic crystals such as herapathite crystals is formed in a transparent matrix. A radial polarizer is then made by drawing this suspension from the center; this aligns the crystals such that they pass light polarized in a direction approximately parallel to a radial line from the location at which the drawing is made.

A tangential polarizer may be formed by rotating the suspension of herapathite crystals so that the crystals become aligned in a direction such as to pass light having a direction of polarization approximately perpendicular to a radial line from the center of rotation.

As will be obvious to those skilled in the art, my invention may be used in any situation where it is desired to attenuate meridional or skew rays. Numerous techniques will also be evident for forming the polarizers I have described. In particular, it would be evident to vary the density of dichroic crystals in the radial direction to controllably attenuate skew rays as a function of degree of skew. Still other arrangements that fall within the skill and scope of this invention will be apparent to those skilled in the art.

What is claimed is:

1. Optical transmission apparatus comprising:
   means for guiding light along a path;
   said guiding means comprising means including focusing means for causing light rays to oscillate with distance about the center of the path;
   means for preventing light from propagating along the guiding means both as meridional rays and as skew rays comprising a plurality of polarizing devices centered on the path;
   said polarizing devices being spaced apart by a distance equal to approximately an integral odd multiple of one-fourth of the period of oscillation of the meridional ray about the center of the path.

2. The optical transmission apparatus of claim 1 wherein:
   the polarizing devices are circularly symmetric linear polarizers.

3. The optical transmission apparatus of claim 1 wherein at least two polarizing devices are radial polarizers, whereby skew rays are attenuated.

4. The optical transmission apparatus of claim 1 wherein at least two polarizing devices are tangential polarizers, whereby skew rays are attenuated.

5. The optical transmission apparatus of claim 1 wherein one polarizing device is a radial polarizer and another polarizing device is a tangential polarizer, whereby meridional rays are attenuated.

6. The optical transmission apparatus of claim 1 wherein the distribution of skew rays and meridional rays is optimized by selective controlled attenuation, to permit the focusing means to be corrected so as to minimize aberrations.

* * * * *